United States Patent [19]

Nichols, III

[11] Patent Number: 4,947,278
[45] Date of Patent: Aug. 7, 1990

[54] REMOTE SENSING POWER DISCONNECT CIRCUIT

[75] Inventor: Edward L. Nichols, III, Annapolis, Md.

[73] Assignee: Smart House Limited Partnership Limited, Upper Marlboro, Md.

[21] Appl. No.: 370,761

[22] Filed: Jun. 23, 1989

[51] Int. Cl.$^5$ ............................................. H07H 3/16
[52] U.S. Cl. ...................................... 361/46; 361/45; 307/140
[58] Field of Search ...................... 361/42, 45, 46, 86, 361/88; 307/125, 126, 130, 140; 324/510, 511

[56] References Cited

U.S. PATENT DOCUMENTS 4,216,516  6/1980  Howell .................................. 361/45
4,649,454  3/1987  Winterton ............................ 361/42

Primary Examiner—Derek S. Jennings
Attorney, Agent, or Firm—Cushman, Darby & Cushman

[57] ABSTRACT

A remote control power disconnect circuit for providing a ground fault across an electrical outlet when an unsafe condition such as a lost neutral or shorting of the AC power switch is detected. The remote control power disconnect circuit is placed at each electrical outlet within a dwelling and applies AC power to the outlet only when an appliance (load) is plugged into the outlet and no fault condition is detected. However, when a fault condition is detected, the circuit also functions to apply a ground fault across the outlet and to shut-off the supply of AC power to the outlet. Then, once the fault condition has been remedied, the circuit may be remotely reset so that AC power may again be applied to the electrical outlet. this circuit functions to prevent electrical shock accidents and fire hazards due to electrical shorts in that AC power is not supplied to the electrical outlet when the outlet is not in use and in that the supply of AC power to the outlet is immediately stopped remotely upon the detection of a fault condition.

9 Claims, 3 Drawing Sheets

REMOTE SENSING POWER DISCONNECT CIRCUIT

BACKGROUND OF THE INVENTION

1. Field of the Invention

The present invention relates to a remotely controlled power disconnect circuit which provides a ground fault and prevents power from being applied to an electrical outlet in the event the electrical neutral is lost, the load is shorted, or some other unsafe condition arises.

2. Description of the Prior Art

In prior art electrical power systems for a dwelling, 120 VAC or 240 VAC power is supplied to the electrical outlets arranged throughout the home. The load on respective circuits including one or more outlets is monitored at a junction box, and a relay is "tripped" so as to disconnect the power to the circuit in the event that an excessive current is drawn by the circuit. Such an excessive current is drawn, for example, when there is a short in a device plugged into an outlet or too many appliances are connected to the circuit. The "tripping" of the relay prevents further supply of electrical power to the circuit so as to prevent perpetuation of the unsafe condition by causing a fire or an electrical shock.

A power disconnect circuit of the type just described may be depicted in simplified form as shown in FIGURE 1. In particular, a ground fault detector, which may comprise a transformer coil, may be used to detect external impedances applied to the power line circuit connected to a particular relay at the junction box, and as described above, application of power to the circuit may be controlled remotely by opening the relay to disconnect the "hot" line when excessive impedances are measured. In other words, the relay is closed during normal operation (i.e., as long as a large external impedance is not detected), but when a large external impedance is detected, the relay is opened so as to shut-off power supply to the circuit. Such a technique is known as universal ground fault protection.

Such a system functions quite well in typical dwellings as long as a large external impedance or ground fault on a particular circuit may be detected by the ground fault detector. However, such a system does not prevent the 120 VAC power from being applied to unused outlets unless the whole power circuit is disconnected. As a result, instances of electric shock may still occur as when a child sticks a metal object such as a fork into an electrical outlet, for example. Accordingly, the prior art arrangement is potentially dangerous.

SUMMARY OF THE INVENTION

The present invention overcomes this problem of the prior art in a cost effective manner by way of an electrical circuit disposed at each electrical outlet which cooperates with a centrally located processing unit (central controller) to disconnect the AC power from its associated outlet unless an appliance is plugged into that outlet. Also, in the event of an open neutral conductor for the power line feeding the outlet or a short in the appliance or switch supplying AC power to the outlet, the circuit of the invention provides a ground fault and prevents the further application of AC power until the faulty condition is remedied. In particular, the circuit of the invention enables remote control application of AC power to an outlet by remotely controlling the condition of a local relay connected to the "hot" AC power line at each outlet. In other words, the relay at a particular outlet is opened until an appliance is plugged into the outlet.

The present invention is particularly useful with a centralized power control system of the type taught by MacFadyen et al in U.S. patent application Ser. No. 07/126,794, the disclosure of which is hereby incorporated by reference. MacFadyen et al disclose a system which controls the supply of AC power as well as communication signals to each electrical outlet. When used in such an arrangement, the circuit of the present invention includes a communications/relay control circuit which receives a signal from a central controller which provides overall power supply control to the dwelling. For example, the central controller determines whether AC power should be applied to a particular electrical outlet to power a load, and if so, the communications/relay control circuit closes the relay at the appropriate outlet so as to energize the load.

The circuit of the invention also includes a power detector which detects whether AC power is actually being applied to the load. In the event that the power detector detects that power is being applied to the load in the absence of a power "ON" signal from the central controller, the circuit of the present invention determines that an "unsafe" condition is present, and a ground fault is applied across the electrical outlet. The communications/relay control circuit also may then instruct the central controller to shut-off AC power to that particular electrical outlet by activating the ground fault circuit interrupter. When the occupier of the dwelling becomes aware of the problem at that particular outlet, he or she may take appropriate action (i.e., unplug the appliance plugged into that outlet) and reset the ground fault circuit interrupter by way of the central controller. On the other hand, a circuit breaker or device that has tripped or been turned OFF manually must be reset or turned ON manually.

BRIEF DESCRIPTION OF THE DRAWINGS

These and other features of the invention will become more readily apparent upon consideration of the following detailed disclosure in conjunction with the drawings, of which.

DETAILED DESCRIPTION OF THE PREFERRED EMBODIMENT

The remote sensing power disconnect circuit of the invention will be described in detail with reference to FIGS. 2 and 3. The invention therein shown and described below provides ON/OFF control of 120 and 240 VAC appliances and other fixed-in-place loads. These are loads which are supplied in accordance with the invention by dedicated branch circuit wiring which places no additional loads on the circuit. For purposes of the description below, these appliances and loads will be simply referred to as "loads".

The present invention may be used in conjunction with an integrated power and communications system of the type set forth by MacFadyen et al in U.S. patent application Ser. No. 07/126,794, whereby an appliance has its power and communications controlled from a central controller. In such a system, the power of the remotely controlled appliance is turned ON or OFF by sending appropriate control signals over a branch channel to the remote control device address, and similarly, the remotely controlled appliance may communicate with the central controller if the appliance is equipped to do so. As shown in FIG. 2, for example, communications between the appliance and the central controller may be routed via communication/relay control circuit 2.

The present invention utilizes this communications feature of the integrated system taught by MacFadyen et al to enable power to be disconnected from a load by a remote controller without requiring a central relay and control wires to the relay. An ON/OFF status indicator may be located on the central controller itself, and local means will allow the power at that outlet to be turned OFF. The circuit of the invention performs this latter function and will now be described with reference to FIGS. 2 and 3.

The circuit of the present invention solves the problems of the prior art by providing a ground fault circuit interrupter (GFCI) to disconnect the load when an error condition is detected. The GFCI may then be reset by the user so as to turn ON the AC power once the fault has been corrected. This may be controlled by the central controller of the power distribution system so as to allow lower cost switching elements to be used downstream in a circuit provided at each outlet. However, the circuit of the invention, provided at each outlet, is designed to assure that the power to the outlet will be disconnected should the lower cost (and less power consuming) semiconductor switch fail, thus not compromising electrical safety.

Figure 1:
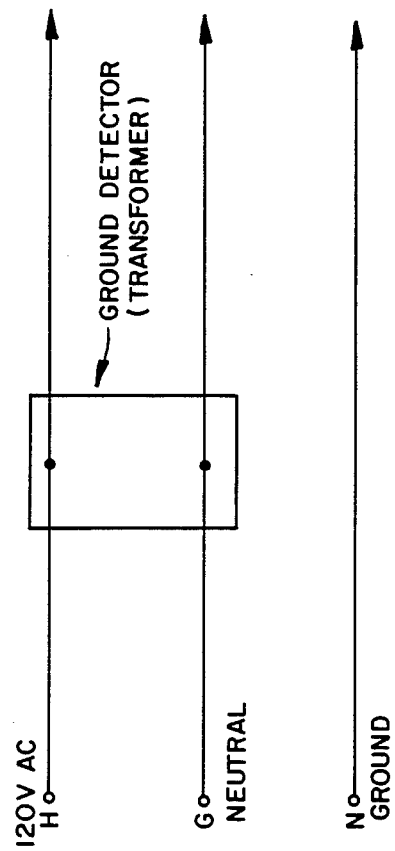
FIG. 1 is a simplified diagram of a universal ground fault detector of the prior art.
Figure 2:
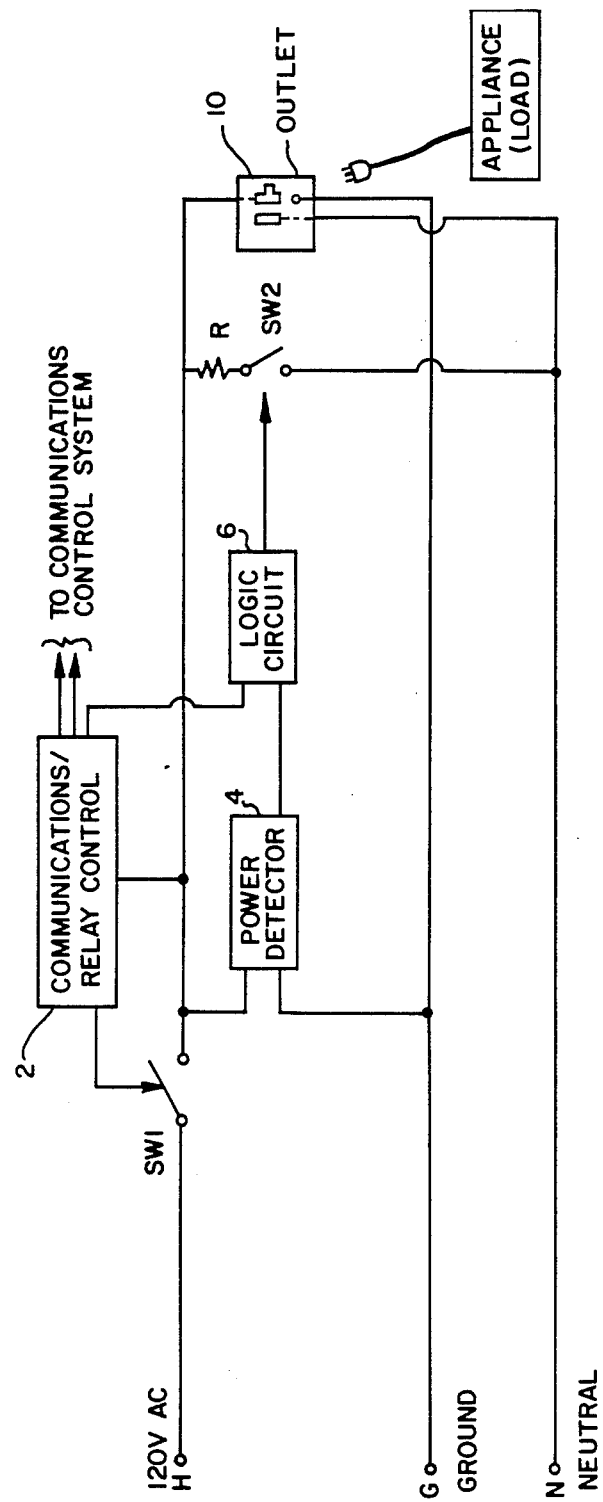
FIG. 2 is a generalized functional diagram of an embodiment of a remote sensing power disconnect circuit in accordance invention.

As shown in FIG. 2, the circuit of the invention includes a communications/relay control circuit 2 for controlling semiconductor switch SW1, a power detector (sensor) 4 for detecting whether AC power is being applied to the outlet 10, and a logic circuit 6 for applying a ground fault across resistor R by closing switch SW2 when the logic circuit 6 determines that a fault condition exists. During operation, communications/relay control circuit 2 informs the communications control system that 120 VAC power should be applied to outlet 10 when an appliance (load) is plugged into the outlet 10. Communications/relay control circuit 2 receives a power desired data signal generated from an appliance interface that is located in the appliance indicating that power is desired. The communications control system then instructs communications/relay controller 2 to close switch SW1 so that the 120 VAC power may be applied to the outlet 10. Power detector 4 measures whether power is being applied to the outlet 10, and when the switch SW1 is closed, power detector 4 determines that power is being applied to the outlet. Therefore, during normal operation the power detector 4 and communications/relay controller 2 both indicate that the outlet is energized and no fault condition exists.

However, in the event of a fault condition the circuit of the invention takes necessary precautions to prevent the occurrence of fire or electrical shock and the like by disconnecting power to the outlet containing the fault condition. The power interrupting feature of the embodiment of FIG. 2 is performed by logic circuit 6. Logic circuit 6 compares the output signal of communications/relay control circuit 2 to the detected output of power detector 4 to determine whether power is being applied to the load in the absence of a signal from the communications control system to apply power to the outlet. When the signals do not coincide, logic circuit 6 determines that a fault condition has occurred, and logic circuit 6 outputs a signal to close switch SW2, thereby applying a ground fault across resistor R so as to ground the AC power applied to the outlet 10. Moreover, upon detection of such a fault condition, the communications/relay control circuit 2 may send a fault signal to the communications control system to make certain that all power to the outlet 10 is shut-off by the ground fault circuit interrupter. The circuit may then be reset manually by the user once the fault condition has been eliminated.

Figure 3:
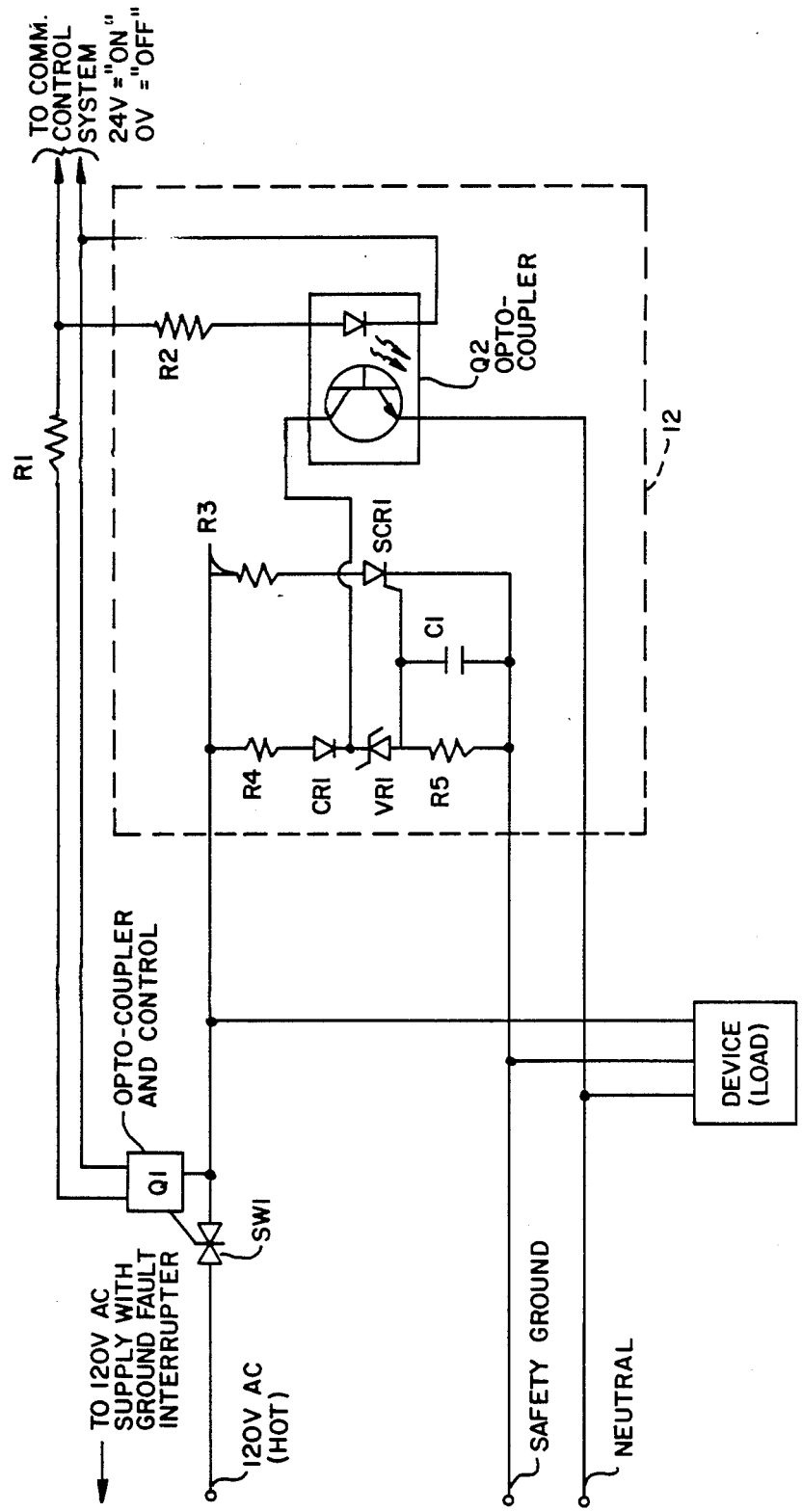
FIG. 3 is a detailed schematic diagram of a preferred embodiment of the invention.

A further embodiment of the present invention is shown in FIG. 3. As shown, a load is plugged into an outlet so as to be connected to the neutral, ground and 120 VAC power lines. However, as in the first embodiment, power is not supplied to the load unless semiconductor switch SW1 is closed. Semiconductor switch SW1 is controlled by opto-coupler and control circuit $Q_1$ in response to low voltage DC "ON" or "OFF" signals from the communications control system as applied across resistor R1. Power detector and logic circuit 12 is connected across the power lines and functions to prevent the application of AC power to the outlet unless the load is plugged therein and no fault condition exists.

Power detector and logic circuit 12 is comprised of a switching diode or triac switch SCR1 which is responsive to a lost neutral detector comprised of a zener diode VR1 and an opto-coupler Q2. The power detector and logic circuit also includes an AC power switch failure detector comprised of resistor R4, diode CR1, opto-coupler Q2, resistor R2 and zener diode VR1. R5 is a gate resistor on SCR1 that keeps the leakage currents from turning on SCR1, while capacitor C1 serves to filter voltage spikes that could turn on SCR1. The operation of the power detector and logic circuit shown in FIG. 3 will now be described.

When either a "live" AC line will not turn-off, or when a neutral conductor in the same circuit opens and disables the normal disconnect means, the power detector and logic circuit of the invention detects the problem and activates the switch SCR1 to produce a ground fault when a threshold is exceeded. The ground fault interrupter (GFCI) in the central controller will then disconnect the AC power to that outlet.

During normal operation, the diode switch SCR1 is connected from the AC (hot) to ground in series with resistor R3 but does not conduct. When an unsafe condition arises such as a lost neutral conductor or switch short in switch SW1, SCR1 starts to conduct and causes a half wave, 35 ma ground fault current to flow therethrough, and the branch circuit breaker is thus caused to open so that no power is delivered to the load. The occupant of the home may then manually reset the breaker once the electrical safety problem has been corrected.

The lost neutral sensor circuit functions by measuring a threshold level which is determined by the characteristics of zener diode VR1. When the neutral conductor opens, the opto-coupler Q2 will no longer clamp the voltage at the junction of diode CR1 and zener diode VR1 to ground, and the voltage will thus rise until it exceeds the threshold of the zener diode VR1, which by way of example, may be 19 volts. The current then generated by the hot conductor will flow across the series combination of resistor R4, diode CR1, zener diode VR1 and resistor R5 and charge capacitor C1 and turn-on switch SCR1. This causes the current to flow through resistor R3 and diode SCR1 to ground to thereby apply a ground fault. The ground fault circuit interrupter will prevent the application of AC power to the outlet.

The circuit of the present invention may also function to detect AC power switch failures (i.e., failures of switch SW1). In normal operation, when the AC switch SW1 is "ON", opto-coupler Q2 is turned ON by a positive voltage across resistor R2 from the central controller and causes the voltage at the junction of zener diode VR1 and diode CR1 to be approximately 0 volts, keeping VR1 from conducting and from turning "ON" the diode switch SCR1. However, when the switch SW1 fails due to a shorted device or a welded contact (when switch SW1 is a relay), opto-coupler Q2 will turn OFF, thereby causing the voltage at the CR1 - VR1 node to rise until diode CR1 begins to conduct so as to turn ON diode switch SCR1. As before, once switch SCR1 starts to conduct, a ground fault is generated.

The invention thus enables one to disconnect a branch circuit because of a problem such as a fire or because a local appliance has malfunctioned and human intervention is required to repair or remove the faulty device. Moreover, since each outlet only receives power when it has been detected that a load is plugged into the outlet, the circuit of the present invention makes the electrical outlets in a home particularly safe in that high AC voltages are not applied to the electrical outlets in the absence of a load. Such safety is improved further by the use of "intelligent" appliances which identify themselves to the central controller before power is applied to the corresponding outlet.

The circuit of the invention thus monitors the outlet and indicates when AC power will not turn off either because of a welded relay contact, a malfunction of the control circuit, or a shorted semiconductor switch. Moreover, the monitoring circuit may determine that a neutral wire is open and appropriately produce a trip condition in the power source if necessary. The simple circuit of the invention thus provides a convenient, remote control, low-cost disconnect circuit for use with a low-current ground fault circuit interrupter.

Although the invention has been described in connection with a sample embodiment, it should be understood that the invention is not limited to such an embodiment. For example, a more sophisticated logic circuit may be placed at each electrical outlet in order to control the outlet in response to a series of power control commands from the communication control system. Accordingly, the present invention is intended to cover all further alternatives, modifications and equivalents as may be included within the scope and spirit of the invention as defined by the appended claims.

I claim:

1. A remote sensing power disconnect circuit for applying a ground fault to a power line in response to a power fault condition occurring during the supply of power to a load connected to said power line, comprising:
    power connecting means for applying power to said load in response to a power signal indicating that said load is to be energized;
    power detector means for detecting whether power is being supplied to said load; and
    means for applying a ground fault to said power line when said power detector means detects that power is being supplied to said load but said power signal does not indicate that said load is to be energized.

2. A remote sensing power disconnect circuit as in claim 1, wherein said power connecting means generates a power ON signal when a power cord of an appliance constituting said load is plugged into an electrical outlet, said power ON signal being processed by a power control device to generate said power signal indicating that said load is to be energized.

3. A remote sensing power disconnect circuit as in claim 2, wherein said power connecting means comprises a switch in said power line and an optical coupler which closes said switch upon receipt of said power signal indicating that said load is to be energized.

4. A remote sensing power disconnect circuit as in claim 3, wherein said switch is a semiconductor switch.

5. A remote sensing power disconnect circuit as in claim 1, wherein said power detector means includes a lost neutral sensor circuit which causes said ground fault applying means to apply said ground fault to said power line when the voltage on a neutral conductor of said power line exceeds a predetermined threshold.

6. A remote sensing power disconnect circuit as in claim 5, wherein said lost neutral sensor circuit includes a zener diode and said ground fault applying means includes a triac switch responsive to said zener diode, whereby when said voltage on said neutral conductor of said power line exceeds said predetermined threshold, said zener diode begins to conduct so as to close said triac switch, thereby causing said ground fault to be applied to said power line.

7. A remote sensing power disconnect circuit as in claim 1, wherein said power detector means includes a failure detector for detecting a short of said power connecting means and causing said ground fault applying means to apply a ground fault to said power line when said short is detected.

8. A remote sensing power disconnect circuit as in claim 7, wherein said failure detector includes an optic coupler and said ground fault applying means includes a triac switch responsive to said optic coupler, whereby said optic coupler is turned off when said power connecting means is shorted so as to cause said triac switch to be closed, thereby causing said ground fault to be applied to said power line.

9. A remote sensing power disconnect circuit as in claim 1, further comprising an electrical outlet for receiving a power cord of an appliance constituting said load, whereby said power line is not connected to said electrical outlet by said power connecting means when said power cord is not inserted into said electrical outlet.

* * * * *